US012737824B2

(12) United States Patent
Silveira et al.

(10) Patent No.: US 12,737,824 B2
(45) Date of Patent: Sep. 15, 2026

(54) SCALING VIRTUAL ASSISTANT SYSTEM EXECUTION VIA MACHINE LEARNING BASED DATA MINING AND EVENT IDENTIFICATION

(71) Applicant: ADP, Inc., Roseland, NJ (US)

(72) Inventors: Roberto Silveira, Porto Alegre (BR); Roberto Coutinho, Porto Alegre (BR); Guilherme Gomes, Porto Alegre (BR); Carlos Nascimento, Porto Alegre (BR); Juliano Vacaro, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 133 days.

(21) Appl. No.: 18/923,662

(22) Filed: Oct. 22, 2024

(65) Prior Publication Data

US 2025/0131117 A1 Apr. 24, 2025

Related U.S. Application Data

(60) Provisional application No. 63/592,474, filed on Oct. 23, 2023.

(51) Int. Cl.
*H04L 51/02* (2022.01)
*G06F 18/241* (2023.01)
(Continued)

(52) U.S. Cl.
CPC ......... *G06Q 40/125* (2013.12); *G06F 18/241* (2023.01); *G06F 21/6218* (2013.01); *G06N 20/00* (2019.01); *H04L 51/02* (2013.01)

(58) Field of Classification Search
None
See application file for complete search history.

(56) References Cited

U.S. PATENT DOCUMENTS 10,503,739 B2 12/2019 Natkin et al.
10,891,956 B2 1/2021 Canim et al.
(Continued)

FOREIGN PATENT DOCUMENTS

CN 116450855 A 7/2023
KR 102146031 B1 8/2020
KR 1020200114173 A 10/2020

OTHER PUBLICATIONS

"Yizhe Ge, Customer churn analysis for a software-as-a-service company, 2017, IEEE, pp. 106-111" (Year: 2017).*
(Continued)

*Primary Examiner* — Amir Mehrmanesh
*Assistant Examiner* — Hassan Saadoun
(74) *Attorney, Agent, or Firm* — Foley & Lardner LLP

(57) ABSTRACT

A system can receive textual input from a client device via a chatbot interface. The system can classify, by machine learning models, the textual input into categories, where the categories correspond to content-based categories and attribute categories. The system can determine, by the machine learning models, a polarity score for the textual input based on the categories. The system can detect, via a payroll processing system, a payroll-related event based on the polarity score and the profile. The system can identify, using the machine learning models, a churning event based on the payroll-related event. The system can generate, by the machine learning models, a command to adjust access
(Continued)

control policies associated with the profile, where the command modifies access to a subset of payroll records maintained in a database.

18 Claims, 6 Drawing Sheets

(51) Int. Cl.

| | |
|---|---|
| ***G06F 21/62*** | (2013.01) |
| ***G06N 20/00*** | (2019.01) |
| ***G06Q 40/12*** | (2023.01) |

(56) References Cited

U.S. PATENT DOCUMENTS

| | | | | |
|---|---|---|---|---|
| 10,990,760 | B1 * | 4/2021 | Monnett | G06F 40/295 |
| 2020/0137002 | A1 * | 4/2020 | Chavda | G06N 20/00 |
| 2020/0349614 | A1 * | 11/2020 | Batcha | G10L 15/26 |
| 2021/0174449 | A1 * | 6/2021 | Thomas | G06F 18/2148 |
| 2021/0390144 | A1 | 12/2021 | B M S et al. | |
| 2023/0037894 | A1 | 2/2023 | Arya et al. | |
| 2023/0044619 | A1 * | 2/2023 | Nielsen | G06Q 30/0202 |
| 2024/0259416 | A1 * | 8/2024 | Miyake | G06F 21/552 |
| 2024/0320443 | A1 * | 9/2024 | Moturi | G06F 40/30 |
| 2024/0430178 | A1 * | 12/2024 | Ambhaikar | H04L 41/5009 |
| 2025/0086499 | A1 * | 3/2025 | Umapathy | G06N 20/00 |

OTHER PUBLICATIONS

Abdul-Majeed et al., “EmoNet: Fine-Grained Emotion Detection with Gated Recurrent Neural Networks”, In Proceedings of the 55th Annual Meeting of the Association for Computational Linguistics, 2017, pp. 718-728, vol. 1.

Demszky et al., “GoEmotions: A Dataset of Fine-Grained Emotions”, arXiv.org, May 1, 2020. https://arxiv.org/abs/2005.00547.

Ekman, “An argument for basic emotions”, Cognition & Emotion, 1992, 33 pages, vol. 6:3-4.

Ekman, “Are there basic emotions?”, Psychological Review, 1992, pp. 550-553, vol. 99(3), https://doi.org/10.1037/0033-295X.99.3.550.

Liu et al., “DENS: a dataset for Multi-class emotion analysis”, Oct. 25, 2019, arXiv.org, https://arxiv.org/abs/1910.11769.

Nascimento, Carlos ET. titled “Method to Measure Fine-Grained Sentiment and Emotion for Virtual Assistant Systems” ADP Brazil Labs.

Pirina et al., “Identifying Depression on Reddit: The Effect of Training Data”, In Proceedings of the 2018 EMNLP Workshop SMM4H: The 3rd Social Media Mining for Health Applications Workshop & Shared Task, 2018, pp. 9-12, Brussels, Belgium, Association for Computational Linguistics.

Visartech, “How to build a chatbot in 2024—Visartech blog”, https://www.visartech.com/blog/ai-chatbot-development/.

* cited by examiner

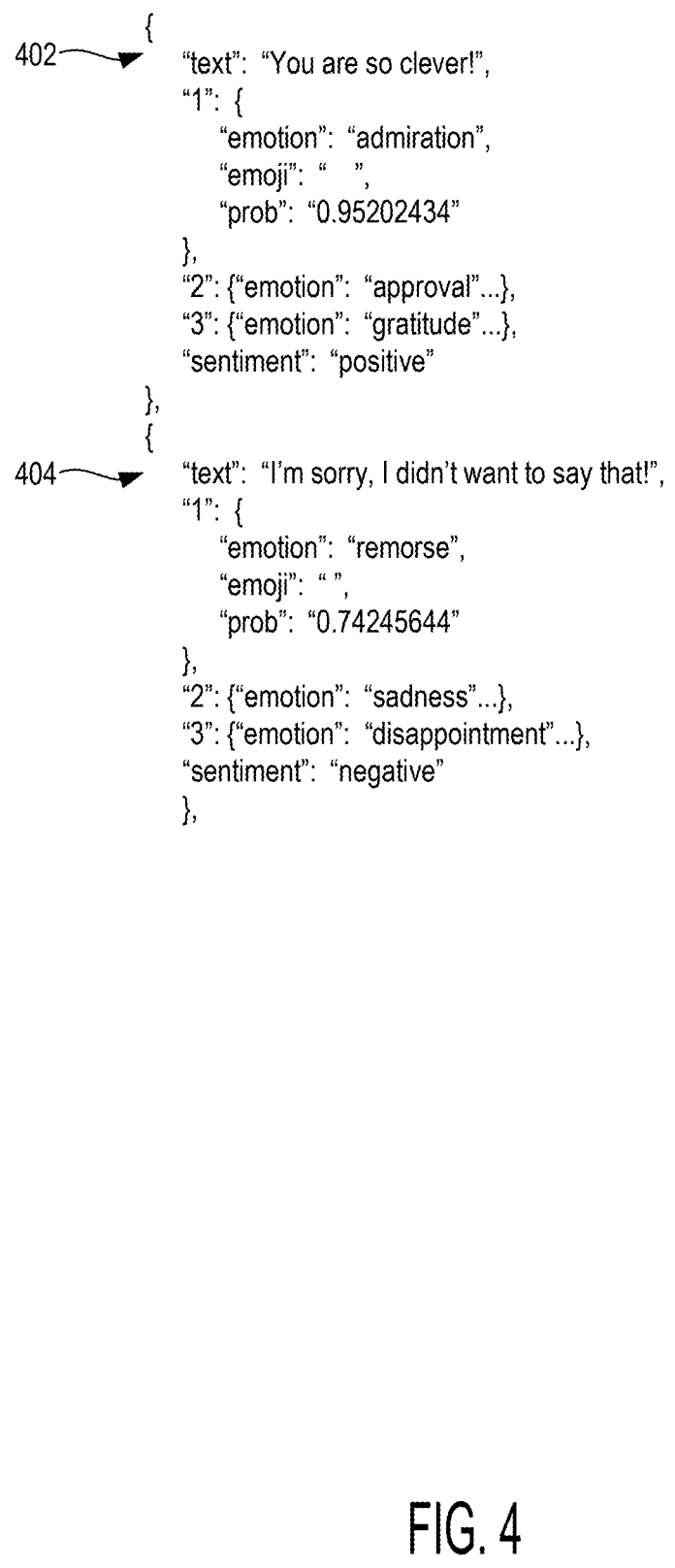

402

{
"text": "You are so clever!",
"1": {
"emotion": "admiration",
"emoji": " ",
"prob": "0.95202434"
},
"2": {"emotion": "approval"...},
"3": {"emotion": "gratitude"...},
"sentiment": "positive"
},

404

{
"text": "I'm sorry, I didn't want to say that!",
"1": {
"emotion": "remorse",
"emoji": " ",
"prob": "0.74245644"
},
"2": {"emotion": "sadness"...},
"3": {"emotion": "disappointment"...},
"sentiment": "negative"
},

FIG. 4

SCALING VIRTUAL ASSISTANT SYSTEM EXECUTION VIA MACHINE LEARNING BASED DATA MINING AND EVENT IDENTIFICATION

CROSS-REFERENCE TO RELATED APPLICATIONS

This application claims the benefit of priority to U.S. Provisional Application No. 63/592,474, filed Oct. 23, 2023, the entirety of which is incorporated by reference herein.

TECHNICAL FIELD

This application is generally related to natural language processing, and, more particularly, to scaling virtual assistant system execution via machine learning-based data mining and event identification.

BACKGROUND

Virtual assistant systems are being used to provide an increasing number of functions or services. However, due to the complex nature of such functions and services and challenges associated with accurate and reliable natural language processing, it can be technically challenging for virtual assistant systems to reliably and accurately execute such functions and services without introducing errors or computing delays or latencies without using excessive computing resources and in an efficient manner.

SUMMARY

Aspects of technical solutions described herein can be directed to a computing architecture configured for efficient natural language processing in virtual assistant systems. For example, aspects of the technical solutions can implement machine learning techniques to classify and evaluate varying degrees of emotions and sentiments expressed in textual inputs. Accurately detecting the intensity or polarity of sentiments can be technically challenging due to the complexity of natural language, context dependency, and varying expression of sentiments across different inputs. These challenges, coupled with the desire for real-time processing and scalability, can impact the performance and accuracy of data processing operations in virtual assistant systems.

The technical solutions described herein can implement a computing architecture that utilizes machine learning models for efficient natural language processing and sentiment analysis in virtual assistant systems that interact with users, process textual inputs, and perform tasks based on user inputs through natural language interfaces. The system can receive textual inputs, classify them into content-based and attribute categories, and determine a polarity score that indicates the intensity of the sentiment. The classified categories and the sentiment can be integrated with profile data structures and mapped to relevant records, thereby facilitating the system to identify specific events or actions associated with the textual input. The computing architecture can process classifications in real-time or near real-time, using algorithms to extract relevant data, generate context-aware responses, and transmit them through an output response data structure to a client system. The data structure can allow the system to make dynamic adjustments based on the emotional context of the input, such as modifying response frequency or content, such that interactions are accurate and contextually adaptive. The computing architecture can improve scalability and processing efficiency by minimizing latency during data or opinion mining, operation execution, and response generation. By utilizing machine learning models trained on large-scale datasets for real-time or near real-time emotional and sentiment analysis, the system can provide faster classification of textual inputs and more efficient execution of tasks based on the inputs.

The technical solutions can leverage domain-specific knowledge to train machine learning models to accurately interpret sentiment within the context of payroll processing, particularly in detecting events indicative of potential user profile departures. The machine learning model can classify textual inputs into content-based and attribute categories relevant to payroll-related interactions, assigning polarity scores to reflect the intensity of the sentiment. By evaluating these categories and polarity scores within the context of payroll events, the machine learning model can detect potential churning events, such as voluntary (e.g., resignation) or involuntary (e.g., termination) departures. Upon detecting such a risk, the machine learning model can be trained to generate commands that instruct the computing architecture to carry out specific instructions targeted at risk mitigation. For example, the system can dynamically adjust access control policies, restrict the user profile's access to sensitive payroll records, or enforce stricter security protocols to protect sensitive information. Furthermore, the computing architecture can respond in real-time or near real-time, such that the system responds to identified churning events with appropriate safeguards to protect sensitive data.

An aspect of this disclosure can be directed to a system. The system can include one or more processors, coupled with memory. The system can receive, from a client device, a textual input via a chatbot interface. The system can identify a profile data structure associated with the client device based on an identifier of the client device. The system can classify, by one or more machine learning models, the textual input into one or more categories. The one or more categories can correspond to content-based categories and attribute categories. The system can determine, by the one or more machine learning models, a polarity score for the textual input based on the one or more categories. The system can input the one or more categories, the polarity score, and the identifier into a payroll processing system to cause the payroll processing system to: map the input to a plurality of payroll records associated with the profile data structure; identify a payroll-related event in response to mapping the input; and extract data corresponding to the payroll-related event. The system can provide the extracted data to the one or more machine learning models to cause the one or more machine learning models to generate an output response data structure corresponding to the extracted data. The system can transmit the output response data structure to the client device to cause the client device to parse the output response data structure and present a corresponding message dialog via the chatbot interface.

The attribute categories can include at least one of a positive emotion, a negative emotion, or a neutral emotion. The content-based categories can include payroll-related interactions directed to the payroll processing system. The payroll-related interactions can include at least one of a request, a complaint, an inquiry, or a feedback submitted by client devices via the chatbot interface. The polarity score can be a numerical value indicating a sentiment of the textual input, wherein the sentiment indicates an emotional tone of the textual input. The system can determine, by the one or more machine learning models, the polarity score for the textual input based at least on a frequency of positive and negative emotion categories within the textual input. The system can determine, by the one or more machine learning models, the polarity score for the textual input based at least on a weight assigned to the content-based categories in response to determining a relevance of the content-based categories with the attribute categories. A dataset of messages used to train the one or more machine learning models can include a plurality of textual inputs submitted by client devices and corresponding output messages. The data corresponding to the payroll-related event can include a time-off request, a salary inquiry, a benefits question, a performance review, or a disciplinary action. The output response data structure generated by the one or more machine learning models can include content items related to the data corresponding to the payroll-related event. The system can determine, by the one or more machine learning models, an escalation value of the textual input based on the polarity score of the textual input and the data corresponding to the payroll-related event. The system can transmit the textual input to a human agent in response to detecting the escalation value exceeding a predefined threshold for human intervention.

An aspect of this disclosure can be directed to a method. The method can include receiving, from a client device, a textual input via a chatbot interface. The method can include identifying a profile data structure associated with the client device based on an identifier of the client device. The method can include classifying, by one or more machine learning models, the textual input into one or more categories. The one or more categories can correspond to content-based categories and attribute categories. The method can include determining, by the one or more machine learning models, a polarity score for the textual input based on the one or more categories. The method can include providing an input, including the one or more categories, the polarity score, and the identifier, to a payroll processing system to cause the payroll processing system to: mapping the input to a plurality of payroll records associated with the profile data structure; identifying a payroll-related event in response to mapping the input; and extracting data corresponding to the payroll-related event. The method can include providing the extracted data to the one or more machine learning models to cause the one or more machine learning models to generate an output response data structure corresponding to the extracted data. The method can include transmitting the output response data structure to the client device to cause the client device to parse the output response data structure and present a corresponding message dialog via the chatbot interface.

The attribute categories can include at least one of a positive emotion, a negative emotion, or a neutral emotion. The content-based categories can include payroll-related interactions directed to the payroll processing system. The payroll-related interactions can include at least one of a request, a complaint, an inquiry, or a feedback submitted by client devices via the chatbot interface. The polarity score can be a numerical value indicating a sentiment of the textual input, wherein the sentiment indicates an emotional tone of the textual input. The method can include determining, by the one or more machine learning models, the polarity score for the textual input based at least on a frequency of positive and negative emotion categories within the textual input. The method can include determining, by the one or more machine learning models, the polarity score for the textual input based at least on a weight assigned to the content-based categories in response to determining a relevance of the content-based categories with the attribute categories. A dataset of messages used to train the one or more machine learning models can include a plurality of textual inputs submitted by client devices and corresponding output messages. The data corresponding to the payroll-related event can include a time-off request, a salary inquiry, a benefits question, a performance review, or a disciplinary action. The output response data structure generated by the one or more machine learning models can include content items related to the data corresponding to the payroll-related event.

An aspect of this disclosure can be directed to a non-transitory computer readable medium, including one or more instructions stored thereon and executable by a processor. The processor can receive, from a client device, a textual input via a chatbot interface. The processor can identify, a profile data structure associated with the client device based on an identifier of the client device. The processor can classify, using one or more machine learning models, the textual input into one or more categories. The one or more categories can correspond to content-based categories and attribute categories. The processor can determine, using the one or more machine learning models, a polarity score for the textual input based on the one or more categories. The processor can input the one or more categories, the polarity score, and the identifier into a payroll processing system to cause the payroll processing system to: map the input to a plurality of payroll records associated with the profile data structure; identify a payroll-related event in response to mapping the input; and extract data corresponding to the payroll-related event. The processor can provide the extracted data to the one or more machine learning models to cause the one or more machine learning models to generate an output response data structure corresponding to the extracted data. The processor can transmit the output response data structure to the client device to cause the client device to parse the output response data structure and present a corresponding message dialog via the chatbot interface.

An aspect of this disclosure can be directed to a system. The system can include one or more processors, coupled with memory. The system can receive, from a client device, a textual input via a chatbot interface associated with a profile. The system can classify, by one or more machine learning models, the textual input into one or more categories. The one or more categories can correspond to content-based categories and attribute categories. The system can determine, by the one or more machine learning models, a polarity score for the textual input based on the one or more categories. The system can detect, via a payroll processing system, a payroll-related event based on the polarity score and the profile. The system can identify, using the one or more machine learning models, a churning event based on the payroll-related event. In response to identifying the churning event, the system can generate, by the one or more machine learning models, a command to adjust access control policies associated with the profile. The command can modify access to a subset of payroll records maintained in a database.

The payroll records can include at least one of compensation details, time-off balances, benefits information, performance reviews, termination records, or tax records. The access control policies can be associated with predefined security protocols governing access to the payroll records. The system can dynamically adjust the predefined security protocols in response to the churning event identified by the one or more machine learning models. The predefined security protocols can include at least one of access restrictions based on user roles, multi-factor authentication requirements, activity-based access control, encryption policies for sensitive data, or time-based access permissions. The access control policies can be associated with one or more fields of the profile. The one or more fields can include an identity field, a compensation field, a benefits field, a time-off field, a tax information field, or a performance review field. The one or more machine learning models can be trained using reinforcement learning. The attribute categories can include at least one of a positive emotion, a negative emotion, or a neutral emotion. The content-based categories can include payroll-related interactions directed to the payroll processing system. The payroll-related interactions can include at least one of a request, a complaint, an inquiry, or a feedback submitted by users via the chatbot interface. A dataset of messages used to train the one or more machine learning models can include a plurality of textual inputs submitted by client devices and corresponding output messages. The system can generate a digest comprising a summary of one or more events associated with the profile. Based on the polarity score and data corresponding to the payroll-related event, the system can adjust frequency of the digest, where the adjustment includes increasing or reducing the frequency of digest delivery.

An aspect of this disclosure can be directed to a method. The method can include receiving, from a client device, a textual input via a chatbot interface associated with a profile. The method can include classifying, by one or more machine learning models, the textual input into one or more categories. The one or more categories can correspond to content-based categories and attribute categories. The method can include determining, by the one or more machine learning models, a polarity score for the textual input based on the one or more categories. The method can include detecting, via a payroll processing system, a payroll-related event based on the polarity score and the profile. The method can include identifying, using the one or more machine learning models, a churning event based on the payroll-related event. In response to identifying the churning event, the method can include generating, by the one or more machine learning models, a command to adjust access control policies associated with the profile, where the command modifies access to a subset of payroll records maintained in a database.

The payroll records can include at least one of compensation details, time-off balances, benefits information, performance reviews, termination records, or tax records. The access control policies can be associated with predefined security protocols governing access to the payroll records. The method can include dynamically adjusting the predefined security protocols in response to the churning event identified by the one or more machine learning models. The predefined security protocols can include at least one of access restrictions based on user roles, multi-factor authentication requirements, activity-based access control, encryption policies for sensitive data, or time-based access permissions. The access control policies can be associated with one or more fields of the profile. The one or more fields can include an identity field, a compensation field, a benefits field, a time-off field, a tax information field, or a performance review field. The attribute categories can include at least one of a positive emotion, a negative emotion, or a neutral emotion. The content-based categories can include payroll-related interactions directed to the payroll processing system. The payroll-related interactions can include at least one of a request, a complaint, an inquiry, or a feedback submitted by users via the chatbot interface.

An aspect of this disclosure can be directed to a non-transitory computer readable medium, including one or more instructions stored thereon and executable by a processor. The processor can receive, from a client device, a textual input via a chatbot interface associated with a profile. The processor can classify, using one or more machine learning models, the textual input into one or more categories. The one or more categories can correspond to content-based categories and attribute categories. The processor can determine, using the one or more machine learning models, a polarity score for the textual input based on the one or more categories. The processor can detect, via a payroll processing system, a payroll-related event based on the polarity score and the profile. The processor can identify, using the one or more machine learning models, a churning event based on the payroll-related event. In response to identifying the churning event, the processor can generate, using the one or more machine learning models, a command to adjust access control policies associated with the profile, where the command modifies access to a subset of payroll records maintained in a database.

BRIEF DESCRIPTION OF THE DRAWINGS

These and other aspects and features of the present implementations are depicted by way of example in the figures discussed herein. Present implementations can be directed to, but are not limited to, examples depicted in the figures discussed herein. Thus, this disclosure is not limited to any figure or portion thereof depicted or referenced herein, or any aspect described herein with respect to any figures depicted or referenced herein.

FIG. 4 depicts an example classification of a textual input, in accordance with some implementations.

DETAILED DESCRIPTION

Aspects of the technical solutions described herein with reference to the figures, which are illustrative examples of this technical solution. The figures and examples below are not meant to limit the scope of the technical solutions to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, the technical solutions and the present implementations encompass present and future known equivalents to the known components referred to herein by way of description, illustration, or example.

For purposes of reading the descriptions of the various implementations below, the following descriptions of the sections of the Specification and their respective contents may be helpful:

I. Section A describes an example system that may be useful for providing machine-learning system functionalities.

II. Section B describes methods for executing operations in virtual assistant systems using machine learning models.

III. Section C describes a computing environment that may be useful for practicing the implementations described herein.

A. Example System for Providing Machine-Learning System Functionalities

Figure 1:
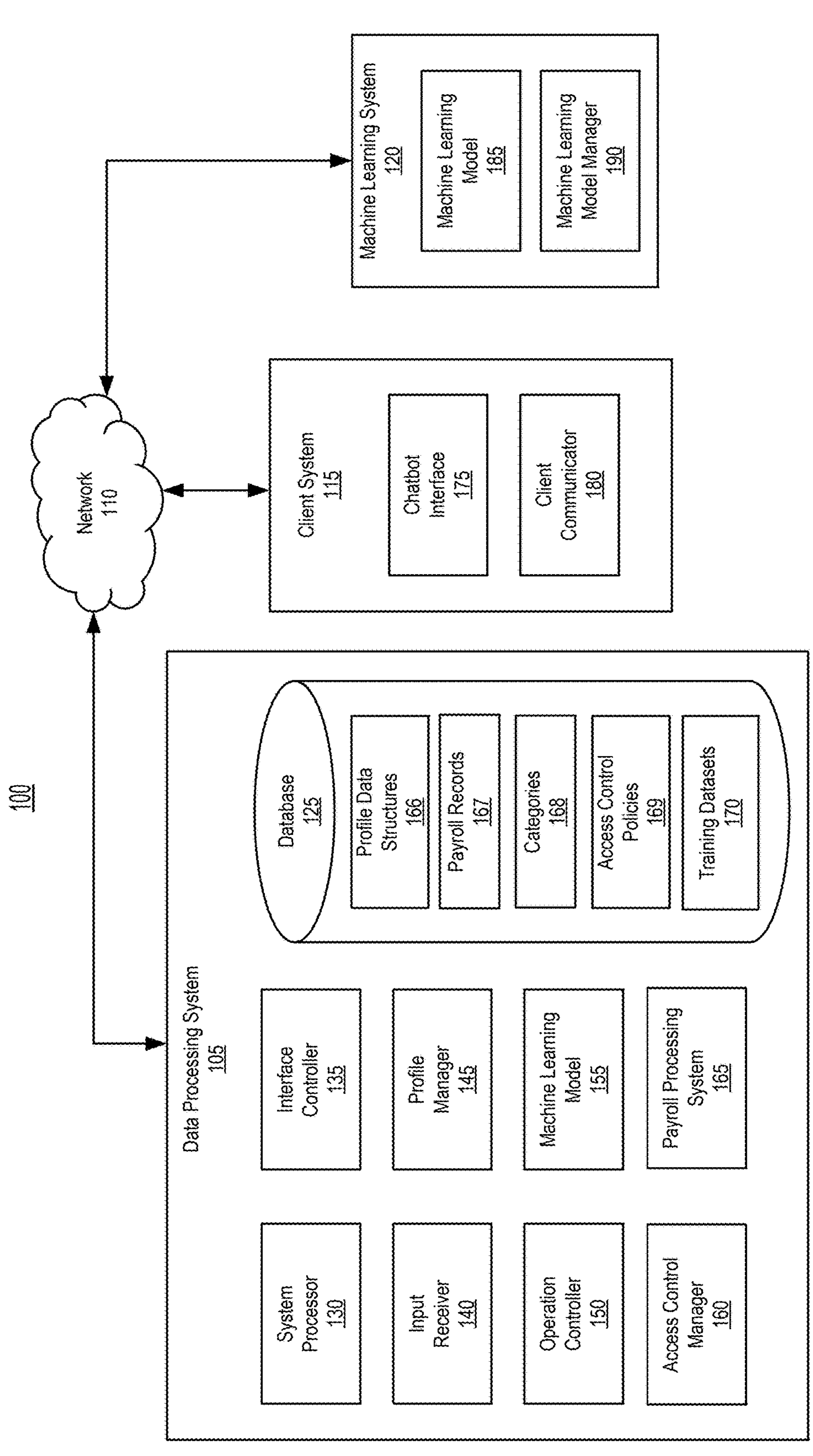
FIG. 1 depicts an example system, in accordance with some implementations.

FIG. 1 depicts an example system. As illustrated by way of example in FIG. 1, a system 100 can include one or more of a data processing system 105, a client system 115, and a machine learning system 120. One or more components of the system 100 can communicate via network 110.

The data processing system 105 can include a physical computer system operatively coupled or coupleable with one or more components of the system 100. The data processing system 105 can include, host, or be hosted by or on a cloud system, a server, a distributed remote system, or any combination thereof. The data processing system 105 can include a virtual computing system, an operating system, and a communication bus to effect communication and processing. The data processing system 105 can include physical infrastructure, such as physical servers, storage devices, and network equipment housed in data centers. The data processing system 105 can include a virtual computing system, which can include cloud-based virtual machines or containers for running applications and services. The data processing system 105 can include an operating system that can function as the core manager, allocating resources, configuring processes, and maintaining seamless interaction between hardware and applications. The data processing system 105 can include a communication bus that can facilitate communication between different components within the system. The data processing system 105 can be configured to connect with external systems to allow for data exchange and service delivery to end users.

The network 110 can include any type or form of network. The geographical scope of the network 110 can vary widely and the network 110 can include a body area network (BAN), a personal area network (PAN), a local-area network (LAN), e.g., Intranet, a metropolitan area network (MAN), a wide area network (WAN), or the Internet. The topology of the network 110 can be of any form and can include, e.g., any of the following: point-to-point, bus, star, ring, mesh, or tree. The network 110 can include an overlay network which is virtual and sits on top of one or more layers of other networks 110. The network 110 can be of any such network topology as known to those ordinarily skilled in the art capable of supporting the operations described herein. For example, the network 110 can be any form of computer network that can relay information between the data processing system 105, the client system 115, and the machine learning system 120. The network 110 can utilize different techniques and layers or stacks of protocols, including, e.g., the Ethernet protocol, the Internet protocol suite (TCP/IP), the ATM (Asynchronous Transfer Mode) technique, the SONET (Synchronous Optical Networking) protocol, or the SD (Synchronous Digital Hierarchy) protocol. The TCP/IP Internet protocol suite can include the application layer, transport layer, Internet layer (including, e.g., IPv6), or link layer. The network 110 can include a type of broadcast network, a telecommunications network, a data communication network, or a computer network.

The client system 115 (also referred to herein as client device 115) can include a computing system that can be used to access the functionality of the data processing system 105. The client system 115 can include a smart phone, mobile device, laptop computer, desktop computer, one or more servers, or any other type of computing device. The client system 115 can include at least one processor and a memory, e.g., a processing circuit. The memory can store processor-executable instructions that, when executed by the processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language.

The client system 115 can include one or more devices to receive input from a user or to provide output to a user. For example, the output capabilities of the client system 115 can be presented through a display device that provides visual feedback to the user. The display device can enhance the user experience with electronic displays, such as liquid crystal displays (LCD), light-emitting diode (LED) displays, or organic light-emitting diode (OLED) displays. The electronic displays can implement interactive features, including capacitive or resistive touch input, allowing for multi-touch functionality. The input functionalities can include a keyboard, mouse, or an integrated touch-sensitive panel on the display device, but are not limited thereto.

Each client device 115 can be associated with an identifier used to identify devices or user profiles operating the client devices 115. The identifier can be of one or more forms, such as a device ID, which can be a code assigned to the client device 115 by the manufacturer or operating system, a MAC address, which can be a hardware address assigned to the client device's network interface, or an IP address, which can identify the client device 115 on a network. The identifier can be a user ID associated with the user profile operating the client device 115, or a session ID, which can be a temporary identifier assigned to a specific session. Other identifiers, such as a serial number, can be used depending on the system and device configuration.

The client system 115 can execute an application that communicates with the data processing system 105. The application can present one or more chatbot interfaces 175. The chatbot interface 175 can include a set of rules or protocols that allow different software programs or systems to communicate with each other. The chatbot interface 175 can provide user interfaces to facilitate interaction. For example, the chatbot interface 175 can support text-based interactions or voice-based interactions. Users can input information, view content, or initiate actions through the chatbot interface 175. The chatbot interface 175 can be associated with a particular client application that communicates with the data processing system 105 to process user prompts. The client application can include an application executing on each client system 115. The client application can include a web application, a server application, a resource, a desktop, or a file. In some implementations, the client application can include a local application (e.g., local to a client system 115), a hosted application, a software-as-a-service (SaaS) application, a virtual application, a mobile application, and other forms of content. The chatbot interface 175 can include or correspond to applications provided by remote servers or third-party servers.

The client system 115 can include, interface with, communicate with, or otherwise utilize a client communicator 180. The client communicator 180 within the client system 115 can be similar to, and include any of the structure and functionality of, the interface controller 135 described in connection with the data processing system 105. For example, the client communicator 180 within the client system 115 can communicate with the data processing system 105 or the machine learning system 120 via the network 110 using one or more communication interfaces to carry out the various operations described herein. The client communicator 180 can be compatible with particular content delivery systems corresponding to particular content objects, structures of data, types of data, or any combination thereof.

The machine learning system 120 can include, interface with, communicate with, or otherwise utilize one or more machine learning models 185 trained on datasets. The machine learning system 120 can include a cloud system, a server, a distributed remote system, or any combination thereof. The machine learning system 120 can include, but is not limited to, at least, central processing unit (CPU), graphics processing unit (GPU), tensor processing units (TPUs), or the like. The machine learning system 120 can include a memory operable to store one or more instructions for operating components of the machine learning system 120 and operating components operably coupled to the machine learning system 120. The machine learning system 120 can be internal to the data processing system 105. The machine learning system 120 can exist external to the data processing system 105 and can be accessed via the network 110. The machine learning system 120 implements or otherwise provides access to one or more application programming interfaces (APIs), via which the data processing system 105 or the client system 115 can access the one or more machine learning models 185 or other functionality of the machine learning system 120.

The machine learning system 120 can include, interface with, communicate with, or otherwise utilize various machine learning models 185. The machine learning model 185 can be deployed within the data processing system 105 (as indicated by machine learning model 155) or externally as remote services. The machine learning model 155, residing within the data processing system 105, can be similar to, and include any of the structure and functionality of, the machine learning model 185. The machine learning models 185 can be trained with same or different types of machine learning techniques, trained with the same or different types of training data, or trained or configured to receive different types of input or provide different types of output. Example machine learning techniques can include neural networks, such as a generative adversarial network (e.g., a generator neural network and a discriminator neural network that are trained simultaneously through adversarial training), a variational autoencoder (e.g., an autoencoder neural network that learns to generate new data samples by modeling the underlying probability distribution of the data), an autoregressive model, or other types of neural networks (e.g., deep learning models, convolutional neural networks, recurrent neural networks, or transformers). Transformers can refer to or include a type of deep learning model architecture configured for natural language processing, including, for example, bidirectional encoder representations ("BERT"), generative pre-trained transformers, text-to-text transformer, transformer-XL, robustly optimized BERT, or distilled BERT. Other types of machine learning techniques can include supervised learning models, unsupervised learning models, semi-supervised learning models, or reinforcement learning models. For example, a supervised machine learning technique can include a support vector machine used for classification and regression tasks. Given a set of labeled training data, a support vector machine can identify the hyperplane that separates the data into classes with the largest possible margin (e.g., distance between the hyperplane and nearest data points from each class).

The machine learning model 185 (e.g., the language models) can be trained on text data. For instance, the machine learning model 185 can be trained, updated, or fine-tuned to perform a variety of text processing tasks, including, but not limited to, generating text, formatting instructions, comprehending and processing natural language input, detecting and interpreting pictographic characters (e.g., emojis), and responding to prompts with contextually relevant information. The machine learning model 185 can include a transformer architecture, such as a generative pre-trained transformer (GPT) architecture. The transformer architecture can include an encoder that can process the input text and a decoder that can generate the output text. The machine learning model 185 can include multiple layers that can operate to process and generate text. For example, embedding layers can convert words or tokens into dense vectors of fixed size, attention layers can use mechanisms such as self-attention to weigh the importance of different tokens in a sequence, and feedforward layers can apply transformations to the data to learn complex patterns. The machine learning model 185 can use a self-attention mechanism to weight different parts of the input sequence when generating predictions. The machine learning model 185 can be trained, fine-tuned, or updated on training datasets 170 using different learning techniques, as described herein.

The machine learning model 185 can determine one or more properties of an input prompt that correspond to natural language. Natural language input can have a syntactic structure in which individual words, collections of words (e.g., phrases), or relative positions of words (e.g., word order) can indicate specific meanings. The machine learning model 185 can be trained, updated, or fine-tuned to parse sentences into their grammatical components to understand the structure and relationships between words. The machine learning model 185 can use phrasing structure rules that define how words combine to form phrases and sentences. The machine learning model 185 can be trained, updated, or fine-tuned to transform sentence structures into more complex ones, such as turning a statement into a question, which can include a transformation that the machine learning model 185 can execute to enhance understanding and generate varied outputs.

The machine learning model 185 can process a wide range of input formats, including but not limited to text, audio, images, video, or other modalities. Based on the input context, the machine learning model 185 can generate output, which can range from simple text responses to complex data structures. The machine learning model 185 can use the input prompt to iteratively predict the next token, word, or phrase to generate responses in response to prompts. The machine learning model 185 can generate instructions or commands that automatically invoke tools or functions to perform specific tasks or operations. The machine learning model 185 can generate formatting instructions that define the visual attributes of graphical elements. In some embodiments, based on the input prompt, the machine learning model 185 can generate a data structure, including details such as text content, layout specifications, and visual or graphical elements.

The machine learning model 185 can classify textual inputs into content-based categories or attribute categories. Examples of attribute categories can include emotional categories, such as positive, negative, or neutral emotional categories to further refine the classification. The machine learning model 185 can preprocess the input by tokenizing the text into individual tokens, reducing words to their root forms, or removing words that do not contribute much to meaning. The machine learning model 185 can extract features from the text, such as indicating word frequencies, weighing important terms, or capturing semantic relationships between words. The machine learning model 185 can be trained to classify a textual input based on its content. The machine learning model 185 can be trained on labeled datasets, where each example pairs the input with its corresponding category. For example, inputs such as “I need help with my paycheck” can be labeled as a “request”, or “I am unhappy with my payment” can be labeled as a “complaint”. The machine learning model 185 can be trained to associate certain features of the text (such as word patterns or semantics) with specific categories. When the machine learning model 185 processes a textual input received from the client device 115, such as “Can you send me my last payslip?”, the machine learning model can preprocess the input, extract relevant features, and apply the learned algorithm to predict the most likely category. In this example, the machine learning model 185 can classify the input as a “request” based on the patterns learned from similar examples during training.

The machine learning model 185 can determine a polarity score for the textual input based on content-based categories or attribute categories. A polarity score can be a numerical value that indicates the sentiment expressed in the input. Sentiment can refer to the attitude, opinion, emotional tone, or feeling expressed in the textual input. The sentiment can be categorized as positive, negative, or neutral. For example, a positive score (e.g., +1) can indicate a high positive sentiment, a negative polarity score (e.g., −1) can indicate a high negative sentiment, and a score close to zero can indicate a neutral sentiment or more balanced tone. The polarity score can indicate how positive, negative, or neutral the user’s message is. For example, “I am thrilled with my bonus” can yield a score close to +1, while “I am furious about my missing paycheck” can result in a score near −1.

The machine learning model 185 can map identified categories 168 to corresponding sentiment values. For example, content-based categories such as “request” can be associated with a neutral sentiment, and “complaint” can be associated with a negative sentiment. Similarly, a positive emotional category can be associated with a positive sentiment, and a negative emotional category can be associated with a negative sentiment. In some embodiments, the machine learning model 185 can use dictionaries of sentiment-related words to assign polarity scores to individual words or phrases. For example, the lexicon can assign a polarity score of −1 to words associated with negative sentiments and a polarity score of +1 to words associated with positive sentiment. The machine learning model 185 can calculate the overall polarity score based on the scores. The machine learning model 185 can be trained on labeled datasets to predict polarity scores by identifying patterns in the text that correlate with positive or negative sentiment. The machine learning model 185 can identify subtle attribute or content-based indicators and determine how positive, neutral, or negative the overall input is. The machine learning model 185 can be trained to process complex textual inputs, including sarcasm and cultural nuances, and determine the associated polarity scores in diverse communication contexts. The reinforcement learning techniques can be used to adapt responses based on user emotions and adjust the chatbot interface 175 dynamically, depending on the user’s mood or humor. In cases where a user expresses frustration, the machine learning model 185 can generate a response with more empathetic language or generate a data structure that simplifies the interface to make navigation easier.

The machine learning model 185 can determine the polarity score for the textual input by evaluating the frequency of positive and negative emotional categories within the input. The more frequently the textual input includes words associated with negative emotions (e.g., angry), the more negative the polarity score becomes. Similarly, the more the input includes words associated with positive emotions (e.g., happy), the higher the positive polarity score assigned by the machine learning model 185. The polarity score can indicate how strongly positive or negative the sentiment is, based on the frequency of emotional expressions in the input.

The machine learning model 185 can determine the polarity score for the textual input based on the relevance of the attribute and content-based categories to one another. The machine learning model 185 can assign weights to content-based categories in response to determining how closely they are related to the attribute categories present in the input. For example, if the content-based category is “complaint” and the attribute category is “anger”, the relevance between these categories can result in a higher weight for the content-based category. The machine learning model 185 can then calculate the overall polarity score based on the assigned weights.

The machine learning model 185 can determine the polarity scores of individual words in a textual input based on the probability values associated with the respective categories, which indicate how much influence each category has on the sentiment outcome. For example, in some embodiments, attribute categories can have a higher probability of influencing the sentiment outcome than content-based categories. In some embodiments, content-based categories can carry more weight in determining sentiment. In some embodiments, attribute and content-based categories can have equal influence. For example, if the input is “I am not happy with not getting vacation”, the machine learning model 185 can classify the textual input into the “negative” emotional category with a probability value of 0.8 and the “complaint” content-based category with a probability value of 0.5. The machine learning model 185 can assign a polarity score of −0.8 to the negative emotional category based on its higher probability and a polarity score of −0.5 to the complaint content-based category, indicating moderate dissatisfaction. The probability scores can indicate the machine learning model's confidence in the classification, with higher probabilities indicating stronger certainty that the respective category is correctly classified. The machine learning model 185 can compute an overall polarity score for the textual input based on how strongly each category contributes to the overall outcome.

The machine learning model 185 can process data extracted from the payroll-related events, such as missed payments, time-off requests, or salary discrepancies, as input context and generate a corresponding response data structure. The response data structure can be a standardized representation of the machine learning model's output, formatted in JSON or XML for processing by other system components. The data structure can include various elements such as a response ID, the original input text that triggered the response, the identified categories 168, the overall polarity score of the input, actionable insights or recommendations, and additional relevant information such as timestamps. The output response data structure generated by the machine learning model 185 can include content items related to the data corresponding to the payroll-related event. For example, if the input is "I am not happy with not getting vacation", the response data structure can include an actionable insight such as "escalate to HR for further investigation" or "review your vacation policy in the employee portal", indicating content items relevant to the payroll-related event. The machine learning model 185 can be trained to modify the response based on attribute indicators, such as offensive, angry, grateful, or joyful words, such that the response is appropriate to the emotional tone of the textual input.

The machine learning model 185 can determine an escalation value for the textual input by evaluating the polarity score of the input and the data corresponding to the payroll-related event. The escalation value can indicate the urgency or severity of the issue, which can be determined based on how negative or positive the message is, combined with the nature of the payroll-related event. For example, if the textual input has a high negative polarity score (e.g., close to −1), indicating strong dissatisfaction, and is associated with an important payroll-related event such as a delayed payment inquiry, the escalation value can exceed a predefined threshold. A threshold can be a specific point or value beyond which a particular action, event, or condition occurs. For instance, the machine learning model 185 can generate a command for the data processing system 105 to involve a human agent once the escalation value exceeds the predefined threshold. The human agent can evaluate the situation based on the provided information and take the optimal approach.

The machine learning model 185 can identify a churning event based on the payroll-related event. A churning event can refer to a situation where a user profile, such as an employee, may be at risk of disengaging, becoming dissatisfied, or leaving the organization. The machine learning model 185 can detect a churning event based on factors such as delayed payments, inconsistent deductions, incorrect tax withholdings, location dissatisfaction, unresolved benefits inquiries, or other pay-related event data. For example, if a user submits a textual input, such as "I am not happy with my current location due to low pay and poor working conditions. I feel like quitting", the machine learning model 185 can classify the textual input into a "concern" content-based category and a "negative" emotional category. The model can determine a high negative polarity score (e.g., −0.9) based on the identified categories 168, indicating heightened dissatisfaction. The machine learning model 185 can flag the textual input as a churning event. Upon identifying a churning event, the machine learning model can generate a command for the data processing system 105. The command can include an instruction or set of instructions that causes the data processing system 105 to perform specific tasks, such as involving a human agent or dynamically adjusting the access control policies 169 associated with a user profile.

In some embodiments, the machine learning model 185 can use the identified attribute, such as a positive, negative, or neutral sentiment, to cause the data processing system 105 to tweak the frequency or content of the digest delivered to the user profile. For example, upon identifying the attribute category or the associated polarity score, the machine learning model 185 can generate a command to cause the data processing system 105 to adjust the frequency of the digest, temporarily block the digest, or include more positive and engaging content. The machine learning model 185 can evaluate emotional inputs, track emotional patterns over time, and generate commands based on a user's evolving emotional state. The commands can cause the data processing system 105 to execute actions, such as integrating emotions into reinforcement learning for improving user experience or inputting attributes into the machine learning model 185 to guide the machine learning model's responses. The data processing system 105 can adjust content in virtual assistant systems based on identified sentiment patterns.

The data processing system 105 can receive the output response data structure from the machine learning model 185 in response to data provided to the machine learning model 185. The data processing system 105 can validate the data format or filter sensitive or unsafe responses generated by the machine learning model 185. The data processing system 105 can transmit the output response data structure to the client device 115. The data processing system 105 or the client device 115 can extract information from the output response data structure, such as the response ID, input text, categories, polarity score, and actionable recommendations, among others. Using the extracted information, the client device 115, via the chatbot interface 175, can generate a human-readable corresponding message dialogue and format the message dialogue according to the design guidelines of the chatbot interface 175, including layout, typography, and color schemes, among others. The client device 115 can display the message via the chatbot interface 175, allowing the user to view the response, such as actionable insights like "escalate to HR for further investigation" or "review your vacation policy in the employee portal".

The client device 115, via the chatbot interface 175, can present one or more interactive elements that a user can interact with. Upon receiving an interaction with any of the interactive elements, the client device 115 can cause the data processing system 105 to execute the corresponding action, such as retrieving additional information, submitting a request, or escalating an issue. For example, if the user selects an interactive element labeled "view vacation policy" the data processing system 105 can retrieve the data stored in the payroll records 167 or the payroll processing system 165 and cause the client device 115 to display the results via the chatbot interface 175.

The machine learning system 120 can include, interface with, communicate with, or otherwise utilize a machine learning model manager 190. The machine learning model manager 190 can train, fine-tune, update, re-train, or otherwise maintain one or more machine learning models 185. The machine learning model manager 190 can include hardware, software, or any combination thereof. The machine learning model manager 190 can reside within the data processing system 105, where the machine learning model manager 190 can manage and coordinate the training, fine-tuning, and updating of the machine learning models 155. In some embodiments, the model manager 190 can exist outside the data processing system 105, operating as a remote service that interacts with the data processing system 105 via APIs. The machine learning model manager 190 can facilitate the training of machine learning models 185 on training datasets 170 and can fine-tune the machine learning models 185 for specific tasks or domains. The machine learning model manager 190 can manage the deployment of machine learning models 185 in production environments and the integration of machine learning models 185 with other systems and services.

The machine learning model manager 190 can continuously monitor the performance of deployed machine learning models 185, identify issues, and update machine learning models 185. The machine learning model manager 190 can use various machine learning algorithms, including supervised learning techniques, to train, fine-tune, or update one or more machine-learning models 185 using labeled data or training dataset 170 to improve the prediction accuracy, classification capabilities, and intent determination of the machine learning models 185. The machine learning model manager 190 can implement unsupervised learning techniques, such as clustering and association rule mining, to identify patterns in unlabeled data, or to generate labels for said unlabeled data. The machine learning model manager 190 can implement reinforcement learning techniques to update the machine learning models 185 based on user-provided feedback or training dataset 170.

The machine learning model manager 190 can train the machine learning model 185 on a large dataset of textual inputs that indicate various attribute categories, such as negative, positive, or neutral emotional categories. Each textual input can be labeled with its corresponding attribute category. The machine learning model manager 190 can balance the training dataset 170, for example, maintaining a representative number of examples for each attribute category to prevent bias. After the machine learning model 185 is trained, the machine learning model manager 190 can evaluate the performance of the machine learning model 185 using a separate validation dataset to confirm that the machine learning model 185 can accurately predict attribute categories for unseen data. The machine learning model manager 190 can train the machine learning model 185 to identify content-based categories, such as inquiries, complaints, or feedback, among others. Each textual input can be tagged with a corresponding category, causing the machine learning model 185 to learn how to classify future inputs accurately. The machine learning model manager 190 can train the machine learning model 185 to detect churning events, which indicate potential disengagement or dissatisfaction. The churning events can be identified through patterns in the textual inputs, such as recurring complaints or inquiries about payroll-related issues.

The machine learning model manager 190 can train the machine learning model 185 to determine the polarity of a textual input, which indicates whether the sentiment is positive, negative, or neutral. Each textual input can be tagged with a corresponding polarity score. The machine learning model 185 can learn to associate specific words or patterns in the text with varying degrees of sentiment. For example, the machine learning model manager 190 can assign positive polarity to inputs with uplifting or approving language, negative polarity to complaints or dissatisfaction, and neutral polarity to statements that lack strong emotion. The machine learning model 185 can predict how positive or negative a sentiment is by determining a polarity score along a spectrum (e.g., from −1 for very negative to +1 for very positive).

The machine learning model manager 190 can train the machine learning model 185 to generate responses to payroll-related queries based on identified categories and polarity scores. The model manager 190 can generate a dataset of payroll-related textual inputs, each labeled with a content-based category, such as inquiry, complaint, or feedback, and an attribute category, such as negative, positive, or neutral emotional categories, along with a polarity score to indicate the strength of the emotion. For example, a textual input such as “What is the status of my paycheck?” can be labeled as an inquiry with a neutral sentiment, while “Why have not I been paid yet?” can be labeled as a complaint with a negative sentiment. During training, the machine learning model 185 can learn to generate responses that align with both the content of the query and its sentiment. For example, if the query is a neutral inquiry such as “What is the status of my paycheck?”, the machine learning model 185 can generate an informative response such as, “Your paycheck is scheduled for delivery on Friday”. If the query is a negative complaint such as “Why have not I been paid yet?”, the machine learning model 185 can generate an empathetic response such as, “We apologize for the delay. Your payment is being processed, and we are resolving the issue”. The machine learning model 185 can adjust its response tone and detail based on the polarity score. For example, if the polarity score indicates strong dissatisfaction, the machine learning model 185 can generate a response such as, “We sincerely apologize for the error in your payment. This is a priority for us, and we are working to resolve it immediately”. For more moderate dissatisfaction, the response can be, “We are looking into your issue with the paycheck and will provide an update soon”. The model manager 190 can evaluate the responses of the machine learning model 185 and fine-tune the machine learning model 185 such that the machine learning model 185 learns how to process query types and sentiment strength and generate personalized and contextually relevant responses to each user input.

The machine learning model manager 190 can train the machine learning model 185 to generate commands corresponding to specific instructions when a churning event or a polarity score exceeds a threshold. The machine learning model manager 190 can use the training dataset 170 that includes textual inputs labeled with categories, polarity scores, and associated commands, such as escalate to HR for employee-related issues, restrict access for security concerns, initiate a human call for high-priority interactions, or provide additional benefits for retention purposes, among others. During training, the machine learning model 185 can learn to map certain thresholds to appropriate actions, such as triggering a command to escalate an issue when a negative polarity score exceeds −0.8, for example, or restricting access in the case of a detected churning event. The machine learning model 185 can be trained to generate the commands dynamically based on the input’s sentiment and context.

In some embodiments, the machine learning model manager 190 can train the machine learning model 185 to generate a command for assigning a human agent when the polarity score exceeds an escalation value. The model manager 190 can use the training dataset 170 including various textual inputs labeled with polarity scores and escalation values. The training dataset 170 can include examples where human intervention is desired, such as highly negative inputs with strong dissatisfaction or unresolved issues. During training, the machine learning model 185 can learn to identify patterns where the polarity score, combined with the content of the input, exceeds a certain threshold that triggers human intervention. For example, if a polarity score of −0.8 or higher is detected, the machine learning model 185 can generate a command for the data processing system 105 to involve a human agent to handle the issue. The data processing system 105 can execute the instructions, such as notifying a human agent by interfacing with a customer support system or routing the request through a ticketing system.

The machine learning model manager 190 can train the machine learning model 185 to avoid generating sensitive or unsafe responses and filter such content. For example, through supervised learning techniques, the machine learning model manager 190 can train the machine learning model 185 on a labeled dataset of examples of sensitive, unsafe, or inappropriate content, where each instance is tagged as "safe" or "unsafe". The machine learning model manager 190 can leverage reinforcement learning techniques by using user feedback or pre-defined rules to adjust the machine learning model's responses.

The machine learning model manager 190 can validate the machine learning model 185 using metrics such as accuracy, F1 score, precision, and recall. Accuracy can measure the percentage of correct predictions made by the machine learning model 185, providing an overall indication of performance. The F1 score can balance precision and recall, which can be important when dealing with imbalanced datasets. The F1 score can provide a single measure of how well the machine learning model 185 minimizes false positives and false negatives. Precision can be used to evaluate how many of the machine learning model's positive predictions were actually correct, while recall can measure how many actual positive cases the machine learning model 185 successfully identified. The model manager 190 can use cross-validation to split the dataset into training and testing sets, such that the machine learning model 185 generalizes well to unseen data.

The data processing system 105 can include, interface with, communicate with, or otherwise utilize a database 125. The database 125 can be a computer-readable memory that can store or maintain any of the information described herein. The database 125 can store data associated with the system 100. The database 125 can include one or more hardware memory devices to store binary data, digital data, or the like. The database 125 can include one or more electrical components, electronic components, programmable electronic components, reprogrammable electronic components, integrated circuits, semiconductor devices, flip flops, arithmetic units, or the like. The database 125 can include at least one of a non-volatile memory device, a solid-state memory device, a flash memory device, or a NAND memory device. The database 125 can include one or more addressable memory regions disposed on one or more physical memory arrays. A physical memory array can include a NAND gate array disposed on, for example, at least one of a particular semiconductor device, an integrated circuit device, or a printed circuit board device. In an aspect, the database 125 can correspond to a non-transitory computer readable medium. In an aspect, the non-transitory computer readable medium can include one or more instructions executable by a system processor 130.

The database 125 can store or maintain one or more data structures, which can include containers, indices, or otherwise store each of the values, pluralities, sets, variables, vectors, numbers, or thresholds described herein. The database 125 can be accessed using one or more memory addresses, index values, or identifiers of any item, structure, or region maintained in the database 125. The database 125 can be accessed by the components of the data processing system 105, the machine learning system 120, the client system 115, or any other computing device described herein, via the network 110. The database 125 can be internal to the data processing system 105. The database 125 can exist external to the data processing system 105 and can be accessed via the network 110. For example, the database 125 can be distributed across many different computer systems (e.g., a cloud computing system) or storage elements and can be accessed via the network 110 or a suitable computer bus interface.

The database 125 can store or maintain one or more profile data structure 166. The profile data structure 166 can include a structured representation of an entity (e.g., user, product, or system). For example, the profile data structure 166 associated with a user profile can include personal details (name, address), employment information (job title, hire date, department), compensation data (salary, bonuses), or tax details (withholdings, filing status), among other attributes. The profile data structure 166 can include attributes with specific data types (e.g., name: string, salary: decimal). Each attribute can have a specific data type, such as a string, integer, date, or Boolean. The profile data structure 166 can organize entities in a hierarchical structure, where one entity acts as a parent to multiple child entities (e.g., a company profile having a hierarchical relationship with department profiles, and department profiles having hierarchical relationships with employee profiles). The profile data structure 166 can include metadata such as creation date, modification timestamps, data source, and ownership, among others.

The profile data structure 166 can include relationships with other data structures to indicate connections or associations between entities. The relationships can be of various types, such as one-to-one, where a single instance of one entity is associated with a single instance of another entity (e.g., a user profile having a one-to-one relationship with a login profile). The relationships can also be one-to-many, where a single instance of one entity is associated with multiple instances of another entity (e.g., a department profile having a one-to-many relationship with employee profiles). In some cases, the relationships can be many-to-many, where multiple instances of one entity are associated with multiple instances of another (e.g., a project profile having a many-to-many relationship with employee profiles to indicate which employees are assigned to the project).

The database 125 can store or maintain one or more payroll records 167. The payroll records 167 can be entries that document a profile entity's compensation and benefits information. The payroll record 167 can include personal information (such as name, address, social security number, and date of birth), employment details (such as job title, hire date, department, and work location), compensation information (such as salary, hourly wage, overtime rate, bonuses, and commissions), tax information (such as federal, state, and local tax withholding details, exemptions, and deductions), benefits information (such as health insurance, retirement plans, paid time off, and disability insurance), time tracking data (such as hours worked, overtime hours, sick leave, and vacation time), deposit information (such as bank account details for paycheck deposits), payroll deductions (such as contributions to retirement plans, health insurance premiums, union dues, and garnishments), performance reviews (such as annual performance evaluations, competency assessments, and goal achievements), termination records (such as termination date, reason for termination, and severance details), and government reporting data (such as information required for forms like W-2 and 1099), among others.

A payroll record 167 can be associated with the profile data structure 166 using identifiers. For example, an identifier, such as an employee ID or a social security number, can establish a one-to-many relationship between the profile data structure 166 and multiple payroll records 167. The identifier can associate the payroll records 167 with the corresponding profile data structure 166, allowing direct access to related information for querying and data retrieval. For instance, in a non-limiting example, a profile data structure 166 can include an employee ID of 12345, name XYZ, department Sales, and salary of $50,000, and the corresponding payroll record 167 for that ID can document a pay period from Jan. 1-15, 2024, with gross pay of $2,500 and net pay of $1,800.

The database 125 can store or maintain one or more categories 168. The categories 168 can correspond to content-based categories and attribute categories. The content-based categories can include payroll-related interactions. The payroll-related interactions can include a request, complaint, inquiry, or feedback submitted by client devices 115 via the chatbot interface 175. The categories 168 can be based on the specific content or topic of the user's prompt or interaction. For example, a request can be, "Can you send me my latest paystub?" A complaint can be, "I have not received my paycheck yet. Can you investigate the issue?" An inquiry can ask, "What is the company's policy on paid time off?" Feedback can be, "I appreciate the company's decision to update the office furniture, it has improved my workspace comfort".

The attribute categories can include positive emotions, negative emotions, or neutral emotions. Positive emotions can include amusement, excitement, joy, love, desire, optimism, caring, pride, admiration, gratitude, relief, and approval. Negative emotions can include fear, nervousness, remorse, embarrassment, disappointment, sadness, grief, disgust, anger, annoyance, and disapproval. Neutral emotions can include calmness, indifference, curiosity, surprise, realization, and confusion. The categories 168 can include churning events, which refer to instances where a user profile is likely to leave the organization or reduce their engagement. The churning events can be identified within the profile data structure 166 based on various factors. For example, decreased engagement can be detected by reduced usage of company resources, such as fewer time-off requests or diminished access to internal tools, which may indicate declining involvement. Performance-related data, such as poor performance reviews or disciplinary actions, can function as indicators of potential churn. Changes in personal circumstances, such as relocation, marriage, or family changes, recorded in the profile data structure 166, can influence a user's decision to stay with the organization.

The database 125 can use a relational database model to store various categories 168, including churning events. For example, a table labeled categories can store various category types, with columns for category ID, category type, and description, among others. The category ID can identify each category, and the category type can define whether the category is content-based, attribute-based, or a churning event. The description can provide additional details associated with that category.

The database 125 can store or maintain one or more access control policies 169. The access control policies 169 can be associated with a profile, such as users, roles, or departments, to regulate access to payroll records 167. The access control policies 169 can include predefined security protocols that govern access to payroll data. The predefined security protocols can include access restrictions based on user roles, multi-factor authentication requirements, activity-based access control, encryption policies for sensitive data, and time-based access permissions. For example, user roles can define different access levels, with payroll administrators having full access, while regular employees can view only their own pay information. Multi-factor authentication can enhance security by including additional identification forms, and activity-based access control can adjust privileges based on user actions. Encryption policies can protect sensitive payroll data, while time-based access permissions can restrict access to payroll data outside of business hours, for example. The access control policies 169 can be implemented through various techniques, such as role-based access control, which uses predefined rules to determine whether access is granted or denied, or attribute-based access control, which grants access based on attributes such as department or job title. Context-based access control can take into account the context of the request, such as time of day or location.

The access control policies 169 can be associated with one or more fields within the profile data structure 166. The fields can include an identity field, a compensation field, a benefits field, a time-off field, a tax information field, or a performance review field. These fields can indicate various aspects of a profile. For example, the identity field can include information used to identify the profile, such as an employee ID, name, or social security number. The compensation field can include earnings data, including salary, bonuses, and commissions. The benefits field can include information about the benefits, such as health insurance, retirement plans, and paid time off. The time-off field can include data related to time off, such as vacation, sick leave, and personal time. The tax information field can include details about tax status and deductions. The performance review field can store data related to the performance evaluations and feedback. The access control policies 169 can control permissions for different types of profiles. For example, a manager can have access to all fields, while a payroll administrator can be restricted to compensation and tax information.

The database 125 can store or maintain one or more training datasets 170. The training datasets 170 can include a collection of textual inputs indicating the messages or queries submitted by users via the chatbot interface 175 and corresponding output messages that indicate the desired responses or actions. The training datasets 170 can undergo preprocessing, including cleaning, normalization, and tokenization, before training. For supervised learning, the output messages can be labeled with a category to guide the machine learning models 185. The training datasets 170 can be formatted in formats such as CSV, JSON, or a custom format to facilitate compatibility with the machine learning models 185.

The training datasets 170 can include a collection of curated text examples from various social media platforms, annotated with a set of emotion categories to provide a benchmark for training and evaluating machine learning models 185 for emotion or content-based identification in textual inputs. For example, the training datasets 170 can include curated text samples with annotated labels for emotion categories. The sequence length in the training datasets 170 can be limited to a threshold to optimize the machine learning model's performance. The training datasets 170 can include a version filtered of the categories 168. The training datasets 170 can be divided into training, test, and validation sets for model evaluation.

An example training dataset 170 can be structured with columns such as dataset_ID (integer) as an identifier for the dataset, interaction_ID (integer) as an identifier for each interaction between the user and the chatbot interface, user_input (text) for the user's message or query, system_output (text) for the desired response, and category (variable character) for labeling the type of interaction, such as content-based categories and attribute categories. For example, in the case of a negative interaction with a user, such as "I can't believe I still have not been paid for last month. This is ridiculous!", the training dataset 170 can include the input as an interaction with dataset_ID 001 and interaction_ID 001. The user input, "I can't believe I still have not been paid for last month. This is ridiculous!" can be paired with the corresponding output, such as "We apologize for the delay in your payment. We are escalating this issue to our payroll department to resolve it". This interaction can be used to train the machine learning model 185 to detect the relevant category 168 and respond with empathy and appropriate action.

The training dataset 170 can include examples of payroll-related events and textual inputs, such as user complaints or concerns, to train the machine learning model 185 to detect a churning event. The churning event can refer to a situation where a user profile may be at risk of disengaging, becoming dissatisfied, or leaving the organization. For example, the training dataset 170 can include instances of inputs such as "I have not received my last paycheck", "My deductions are incorrect again", or "I am unhappy with my work location due to low pay", along with corresponding attribute categories (e.g., "negative" emotional category) and content-based categories (e.g., "concern" or "pay-related issue"). Each training example in the training dataset 170 can be assigned a polarity score, indicating the degree of dissatisfaction or disengagement. By training the machine learning model 185 on these inputs, the machine learning model 185 can identify patterns of dissatisfaction or potential disengagement.

The data processing system 105 can include, interface with, communicate with, or otherwise utilize a system processor 130. The system processor 130 can be or include any script, file, program, application, set of instructions, or computer-executable code that can be configured to execute one or more instructions associated with the data processing system 105. The system processor 130 can include an electronic processor, an integrated circuit, or the like, including one or more of digital logic, analog logic, digital sensors, analog sensors, communication buses, volatile memory, nonvolatile memory, and the like. The system processor 130 can include, but is not limited to, at least one microcontroller unit (MCU), microprocessor unit (MPU), central processing unit (CPU), graphics processing unit (GPU), physics processing unit (PPU), embedded controller (EC), or the like. The system processor 130 can include a memory operable to store one or more instructions for operating components of the system processor 130 and operating components operably coupled to the system processor 130. For example, the one or more instructions can include one or more of firmware, software, hardware, operating systems, or embedded operating systems. The system processor 130 or the data processing system 105 generally can include one or more communication bus controllers to effect communication between the system processor 130 and the other elements of the data processing system 105.

The data processing system 105 can include, interface with, communicate with, or otherwise utilize an interface controller 135. The interface controller 135 can be or include any script, file, program, application, set of instructions, or computer-executable code that can be configured to facilitate communication between the data processing system 105, the client system 115, and the machine learning system 120. The interface controller 135 can include hardware, software, or any combination. The interface controller 135 can facilitate communication between the data processing system 105, the network 110, the client system 115, or the machine learning system 120 via one or more communication interfaces. A communication interface can include, for example, an application programming interface ("API") compatible with a particular component of the data processing system 105, the client system 115, or the machine learning system 120. The communication interface can provide a particular communication protocol compatible with a particular component of the data processing system 105, a particular component of the client system 115, or a particular component of the machine learning system 120. The interface controller 135 can be compatible with particular content objects and can be compatible with particular content delivery systems corresponding to particular content objects, structures of data, types of data, or any combination thereof. For example, the interface controller 135 can be compatible with the transmission of structured or unstructured data according to one or more metrics or data of the machine learning system 120.

The data processing system 105 can include, interface with, communicate with, or otherwise utilize an input receiver 140. The input receiver 140 can be or include any script, file, program, application, set of instructions, or computer-executable code that is configured to process input data in the form of a message, query, or prompt. The input receiver 140 can include hardware, software, or any combination thereof. The input data can include any user-provided command, request, or text data. For example, the textual input can include a request for viewing a recent paystub, checking available paid time off, updating tax withholdings, or requesting a leave of absence, among others. The textual input can be associated with a user profile by associating the textual input with the identifiers of the user profile. For example, when a user submits a request, the input receiver 140 can associate that request with the user profile based on identifiers such as a user ID, session ID, or device ID. The input receiver 140 can receive textual inputs from the client system 115 in natural language (e.g., a text string) and process textual inputs through user interactions with the chatbot interface 175. User interactions can include clicking buttons, entering text, or using voice commands within the chatbot interfaces 175. The input receiver 140 can expose an API endpoint, allowing other applications or systems to send prompts in structured formats such as JSON, facilitating tasks related to payroll or other system interactions.

The data processing system 105 can include, interface with, communicate with, or otherwise utilize a profile manager 145. The profile manager 145 can be or include any script, file, program, application, set of instructions, or computer-executable code that can be configured to manage profile data structures 166. The profile manager 145 can assign identifiers to each profile data structure 166. The profile manager 145 can retrieve or update the profile data structures 166 based on the associated identifiers. When additional or updated data points are available, the profile manager 145 can identify the corresponding profile data structures 166 based on entity identifiers or reference keys. The profile manager 145 can extract relevant attributes or metadata from the incoming data points. The profile manager 145 can identify entity identifiers or reference keys embedded within the data point. The profile manager 145 can maintain an index structure that maps entity identifiers to corresponding profile data structures 166. Upon receiving an additional data point, the profile manager 145 can query the index using the extracted identifier to identify the target profile data structure 166. The profile manager 145 can implement a hash table, where the entity identifier can be hashed to generate a key. The profile manager 145 can use the key to access the corresponding profile data structure 166. The profile manager 145 can maintain data roles associated with profile data structures 166 by assigning a data role to a corresponding field in the profile data structure 166. As user roles or organizational structures change, the profile manager 145 can update data roles.

The profile manager 145 can identify a corresponding profile data structure 166 associated with the client device 115 based on one or more identifiers. For example, the profile manager 145 can receive the identifier from the client device 115, which can be a device ID, MAC address, IP address, or other identifying information. The profile manager 145 can query the database 125 using the received identifier to identify the corresponding profile data structure 166. If a matching identifier is found, the profile manager 145 can retrieve the profile data structure 166, which includes relevant information associated with the user profile operating the client device 115.

The profile manager 145 can generate a digest that summarizes events associated with a profile data structure 166. The digest can be used as an automated internal communication tool for the organization, providing updates relevant to the user profile. The profile manager 145 can compile the digest by aggregating various data points, such as company news, employee updates, industry trends, and system-triggered events. The events can include new hire introductions, internal job postings, policy changes, and upcoming organizational events. The profile manager 145 has manager over how frequently the digest is sent. The digest can be set to send on a regular schedule, such as weekly, biweekly, or monthly, depending on the organization's predefined settings. In some cases, such as when a payroll-related event with a polarity score is detected, the profile manager 145 can dynamically adjust the frequency of digest delivery, for instance, in response to receiving a command generated by the machine learning model 185. For example, if the polarity score indicates dissatisfaction or potential disengagement (a negative polarity score), the profile manager 145 can decrease the frequency of digest delivery to avoid overwhelming the user with unnecessary communications while still keeping them informed. In some cases, the profile manager 145 can increase the frequency of delivery based on the user's emotional state and the importance of recent events.

The data processing system 105 can include, interface with, communicate with, or otherwise utilize an operation controller 150. The operation controller 150 can be or include any script, file, program, application, set of instructions, or computer-executable code that can be configured to manage and execute actions associated with one or more components of the data processing system 105. The operation controller 150 can define and manage workflows comprised of multiple interconnected tasks. The operation controller 150 can initiate, monitor, and control the execution of workflow steps. The operation controller 150 can implement conditional logic for dynamic workflow routing. The operation controller 150 can execute multiple tasks concurrently through parallel processing. The operation controller 150 can implement error handling and recovery mechanisms for workflow exceptions. The operation controller 150 can track workflow progress and provide status updates. For example, the operation controller 150 can include one or more interfaces to detect input at various portions of a workflow and can provide output responsive to specific portions of a workflow.

The data processing system 105 can include, interface with, communicate with, or otherwise utilize an access control manager 160. The access control manager 160 can be or include any script, file, program, application, set of instructions, or computer-executable code that can be configured to manage and control the access control policies 169 associated with profile data structures 166. The access control manager 160 can define and manage security profiles to regulate access to different parts of the profile data structure 166, based on roles, attributes, or other criteria. The access control manager 160 can assign specific roles to users, for example, granting appropriate permissions to access and modify profile data. For example, a payroll administrator can have full access to all fields, while a regular employee can access only selected fields. The access control manager 160 can enforce access control policies 169 by monitoring user activity, verifying permissions before allowing data access or modification, and tracking unauthorized access attempts. The access control manager 160 can generate audit logs of user actions for review and analysis. The access control manager 160 can update the access control policies 169 to accommodate changes in organizational structure, security requirements, or compliance regulations.

The access control manager 160 can implement role-based access control (e.g., based on their organizational position), attribute-based access control (e.g., based on department or job title), or context-based access control (e.g., based on time, location, or device used for the access request) to regulate access. The access control manager 160 can integrate with the profile data structures 166 via keys, where a reference field in the profile data structure 166 can correspond to a data role or permission table managed by the access control manager 160. The access control manager 160 can expose API calls that allow other system components to verify permissions and enforce access controls.

The access control manager 160 can dynamically adjust the access control policies 169 associated with the user profile in response to a command generated upon identifying a churning event by the machine learning model 185, for example, based on changing circumstances or events. For example, based on user roles, multi-factor authentication requirements, activity-based access control, encryption policies for sensitive data, or time-based access permissions, the access control manager 160 can modify access to payroll records 167 maintained in the database 125. The access control manager 160 can adjust access to payroll records, including compensation details, time-off balances, performance reviews, termination records, or tax records. Upon detecting the churning event, the access control manager 160 can restrict the user profile's ability to view or modify payroll records 167, limit access to sensitive data, or disable specific features such as requesting time off or changing benefits, among others. In some cases, the access control manager 160 can enforce additional security measures such as multi-factor authentication or even temporarily deactivate the user's account entirely in extreme cases.

The data processing system 105, via the access control manager 160, can execute security-enhancing tasks, such as generating detailed logs of actions associated with the user profile for review. The access control manager 160 can implement data encryption policies, such as using encryption algorithms to prevent unauthorized access and implementing secure key management practices to protect encryption keys. The access control manager 160 can facilitate network segmentation by dividing the network into smaller, isolated zones to limit the impact of security breaches. The access control manager 160 can restrict network traffic by implementing firewalls and intrusion detection systems, such that authorized traffic flows through the network.

The data processing system 105 can include, interface with, communicate with, or otherwise utilize a payroll processing system 165. The payroll processing system 165 can be or include any script, file, program, application, set of instructions, or computer-executable code that can be configured to identify payroll-related events associated with profile data structures 166. The payroll processing system 165 can integrate or utilize one or more of the machine learning models 185. The payroll-related events can include time-off requests, salary inquiries, benefits questions, performance reviews, and disciplinary actions. For time-off requests, the payroll processing system 165 can maintain the request details, such as vacation, sick leave, or personal time, and maintain a record of the user profile's time-off balance. For salary inquiries, the payroll processing system 165 can maintain up-to-date records of the profile's salary, deductions, and other compensation-related information. In the case of benefits questions, the payroll processing system 165 can maintain information about eligibility, enrollment, and coverage changes. Performance reviews can be logged, including any changes to the profile's compensation, bonuses, or promotion status. The payroll processing system 165 system can record disciplinary actions, such as warnings, suspensions, or terminations, and store any related information about the impact on salary or benefits. In some embodiments, the payroll-related events can be stored in the payroll records 167 maintained in the database 125.

The data processing system 105 can input the categories 168 (such as attribute and content-based categories), the polarity score, and the identifier associated with the client device 115 into the payroll processing system 165 via the operation controller 150 or interface controller 135, depending on the implementation. The payroll processing system 165 can query the database 125 and map the input to the payroll records 167 associated with the profile data structure 166. The payroll processing system 165 can identify an appropriate payroll-related event based on the mapping. For example, if the input is "What's going on with my paycheck?" the machine learning model 185 can classify the input into the "inquiry" content-based category and the "negative" emotional category, assigning a polarity score of −0.5, for instance. In this example, the polarity score can indicate some level of frustration but not an explicit complaint. The payroll processing system 165 can, via the profile manager 145, retrieve the profile data structure 166 associated with the client device 115. The payroll processing system 165 can map the categories 168, such as content-based and attribute categories, to the associated payroll records 167 maintained in the database 125 to identify any potential issues, such as a delayed or missed payment, incorrect deductions, or other anomalies. Based on the payroll data and the polarity score, the payroll processing system 165 can evaluate a possible payroll-related events to identify the relevant payroll-related event. For example, given the negative polarity score and a paycheck inquiry, the payroll processing system 165 can identify the correct payroll-related event, such as a "delayed payment inquiry" or a "paycheck discrepancy inquiry".

In another example, if a textual input is "I am not happy with my new office location, I feel like quitting", the machine learning model 185 can classify the input into the "complaint" content-based category and assign a negative polarity score, indicating heightened concern or dissatisfaction. The payroll processing system 165 can retrieve the profile data structure 166 and map the complaint and sentiment to the relevant payroll records 167 maintained in the database 125. Based on the mapping, the payroll processing system 165 can identify relevant payroll-related events, such as potential location updates, eligibility for benefits such as relocation assistance, or internal options for discussing promotion or new role opportunities.

Figure 2:
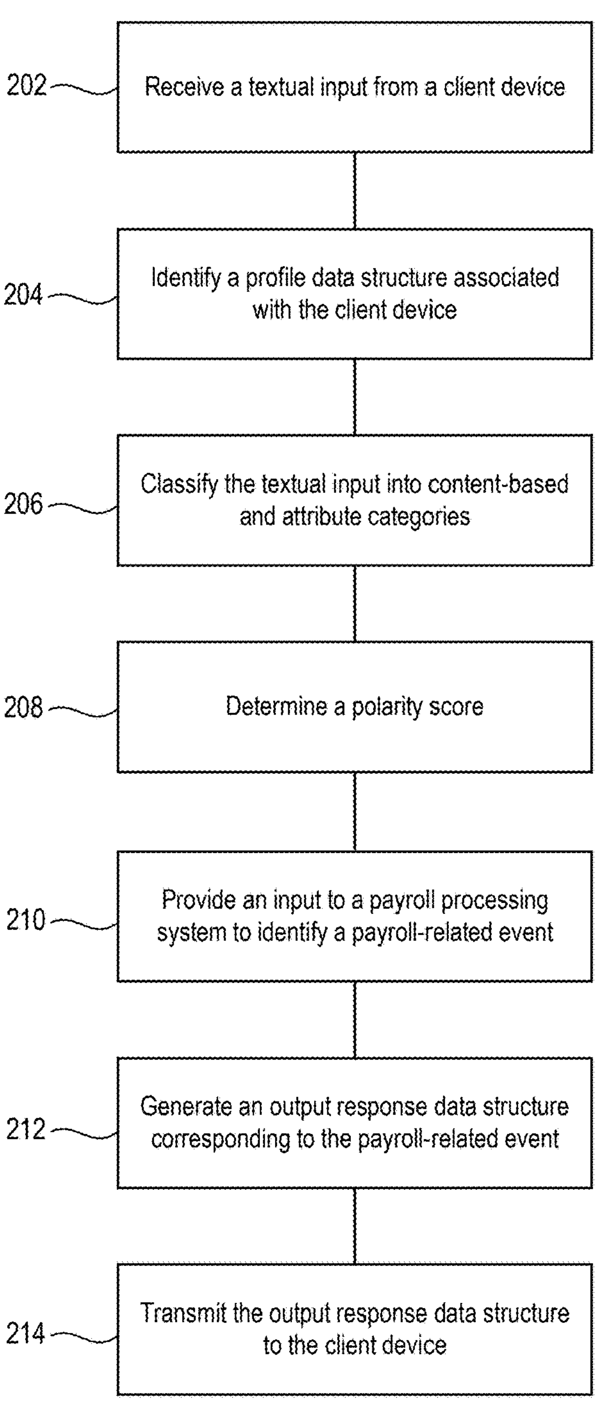
FIG. 2 depicts an example method of operation execution in virtual assistant systems based on data mining and event identification using machine learning models, in accordance with some implementations.

B. Methods for Executing Operations in Virtual Assistant Systems Using Machine Learning Models FIG. 2 depicts a method 200 of operation execution in virtual assistant systems based on data mining and event identification using machine learning models. The method 200 can be implemented using a system 100, 600, or any other features discussed in FIG. 1 or FIG. 6. The method 200 can include Acts 202-214. The Acts 202-214 can be executed in any order or sequence.

At 202, the method can receive a textual input from a client device. In an aspect, the method can include receiving, from the client device, the textual input via a chatbot interface. The input can include commands or requests related to payroll actions.

At 204, the method can identify a profile data structure associated with the client device. In an aspect, the method can include identifying the profile data structure associated with the client device based on an identifier. The identifier can be a code, such as a user ID or session token, that associates the input with the user's specific payroll records and information. The identifier can be included in the transmission of the textual input via the chatbot interface in some examples. Alternatively, or in addition, the identifier can be accessed separately from the client device, and associated with the textual input received from that client device.

At 206, the method can classify the textual input into content-based and attribute categories. In an aspect, the method can include classifying the textual input by one or more machine learning models. The machine learning models can be trained on a dataset. In some examples, the dataset includes messages provided to a payroll processing system. The dataset of messages used to train the machine learning models can include a plurality of textual inputs submitted by client devices and corresponding output messages. The machine learning models can classify the textual input into one or more categories. The categories can correspond to content-based categories and attribute categories. The attribute categories can include at least one of a positive emotion, a negative emotion, or a neutral emotion. The content-based categories can include payroll-related interactions directed to the payroll processing system. The payroll-related interactions can include at least one of a request, a complaint, an inquiry, or a feedback submitted by client devices via the chatbot interface.

At 208, the method can determine a polarity score. In an aspect, the method can include determining, by the machine learning models, the polarity score for the textual input based on the categories. The polarity score can be a numerical value indicating a sentiment of the textual input. The sentiment can indicate an emotional tone of the textual input. In an aspect, the method can include determining, by the machine learning models, the polarity score for the textual input based at least on a frequency of positive and negative emotion categories within the textual input. In another aspect, the method can include determining, by the machine learning models, the polarity score for the textual input based at least on a weight assigned to the content-based categories in response to determining a relevance of the content-based categories with the attribute categories. In another aspect, the method can include determining, by the machine learning models, an escalation value of the textual input based on the polarity score of the textual input and the data corresponding to the payroll-related event.

At 210, the method can provide an input to a payroll processing system to identify a payroll-related event. In an aspect, the method can include providing the input, including the one or more categories, the polarity score, and the identifier, to the payroll processing system to cause the payroll processing system to: map the input to a plurality of payroll records associated with the profile data structure, identify a payroll-related event in response to mapping the input, and extract data corresponding to the payroll-related event. The data corresponding to the payroll-related event can include a time-off request, a salary inquiry, a benefits question, a performance review, or a disciplinary action.

At 212, the method can generate an output response data structure corresponding to the payroll-related event. In an aspect, the method can include providing the extracted data to the machine learning models to cause the machine learning models to generate the output response data structure corresponding to the extracted data. The output response data structure generated by the machine learning models can include content items related to the data corresponding to the payroll-related event.

At 214, the method can transmit the output response data structure to the client device. In an aspect, the method can include transmitting the output response data structure to the client device to cause the client device to parse the output response data structure and present a corresponding message dialog via the chatbot interface. In another aspect, the method can include transmitting the textual input to a human agent in response to detecting the escalation value exceeding the predefined threshold for human intervention.

Figure 3:
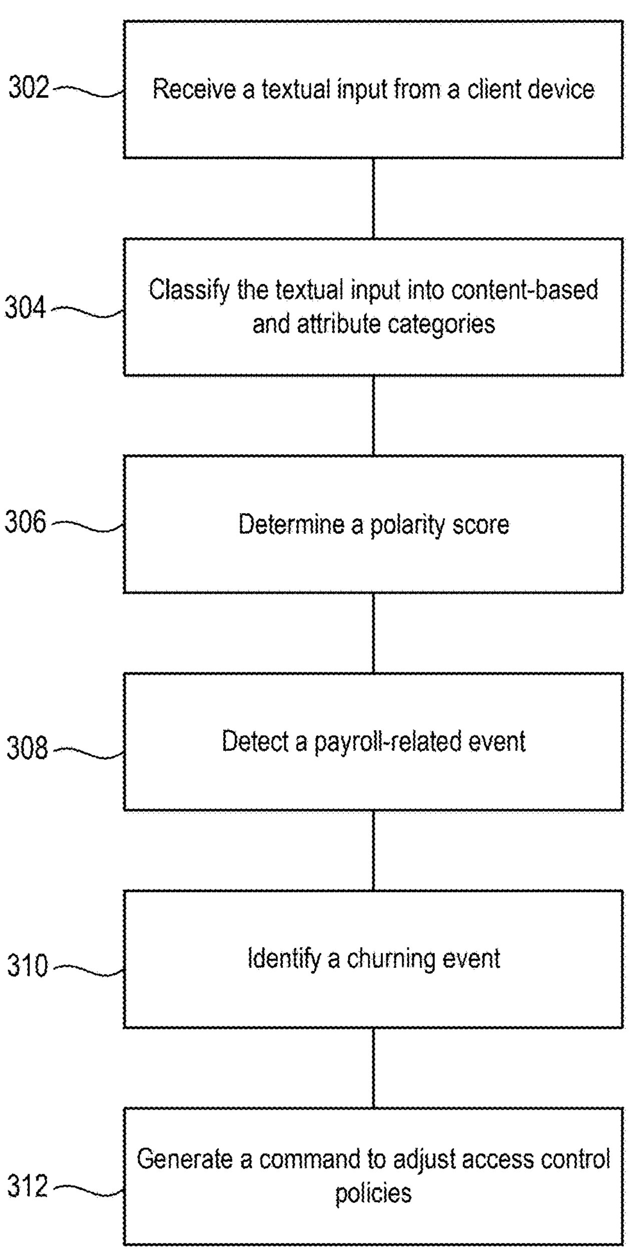
FIG. 3 depicts an example method of implementing use cases in virtual assistant systems based on data mining and event identification using machine learning models, in accordance with some implementations.

FIG. 3 depicts a method 300 of implementing use cases in virtual assistant systems based on data mining and event identification using machine learning models. The method 300 can be implemented using a system 100, 600, or any other features discussed in FIG. 1 or FIG. 6. The method 300 can include Acts 302-312. The Acts 302-312 can be executed in any order or sequence.

At 302, the method can receive a textual input from a client device. In an aspect, the method can include receiving, from the client device, the textual input via a chatbot interface associated with a profile. The input can be in the form of a question, request, or command related to payroll information.

At 304, the method can classify the textual input into content-based and attribute categories. In an aspect, the method can include classifying the textual input by one or more machine learning models. The machine learning models can be trained on a dataset. In some examples, the dataset includes messages provided to a payroll processing system. The dataset of messages used to train the machine learning models can include a plurality of textual inputs submitted by client devices and corresponding output messages. The categories can correspond to content-based categories and attribute categories. The attribute categories can include at least one of a positive emotion, a negative emotion, or a neutral emotion. The content-based categories can include payroll-related interactions directed to the payroll processing system. The payroll-related interactions can include at least one of a request, complaint, inquiry, or feedback submitted by users via the chatbot interface. The machine learning models can be trained using reinforcement learning.

At 306, the method can determine a polarity score. In an aspect, the method can include determining, by the machine learning models, the polarity score for the textual input based on the categories. The polarity score can indicate the overall sentiment of the user, such as positive, neutral, or negative. The polarity score can indicate the user's emotional state during the interaction.

At 308, the method can detect a payroll-related event. In an aspect, the method can include detecting, via the payroll processing system, the payroll-related event based on the polarity score and the profile. For example, the method can include detecting events, such as delayed payments, benefits inquiries, or discrepancies in payroll data based on the analysis of the input.

At 310, the method can identify a churning event. In an aspect, the method can include identifying, using the machine learning models, the churning event based on the payroll-related event. For example, the method can include flagging the event as a potential risk of disengagement, dissatisfaction, or possible departure, indicating the desire for proactive intervention.

At 312, the method can generate a command to adjust access control policies. In an aspect, the method can include generating, by the machine learning models, the command to adjust access control policies associated with the profile in response to identifying the churning event. The command can modify access to a subset of payroll records maintained in a database. The payroll records can include at least one of compensation details, time-off balances, benefits information, performance reviews, termination records, or tax records. The access control policies can be associated with predefined security protocols governing access to the payroll records. The predefined security protocols can include at least one of access restrictions based on user roles, multi-factor authentication requirements, activity-based access control, encryption policies for sensitive data, or time-based access permissions. In another aspect, the method can include dynamically adjusting the predefined security protocols in response to the churning event identified by the machine learning models. The access control policies can be associated with one or more fields of the profile, the one or more fields comprising an identity field, a compensation field, a benefits field, a time-off field, a tax information field, or a performance review field.

FIG. 4 depicts an example classification of a textual input by the machine learning model 185. The machine learning model 185 can classify the textual input into attribute categories, assign probability values to each category, and determine the overall sentiment of the input. In the example implementation 402, the textual input "You are so clever!" is classified by the machine learning model 185. The machine learning model 185 can classify the textual input into multiple attribute categories based on the content. For example, the first classification result identifies the attribute category of "admiration," with a high probability of 0.95202434. The probability score can indicate a strong likelihood that the input indicates a positive emotional category. In some embodiments, the machine learning model 185 can identify and associate an appropriate emoji with the category, although no emoji is shown in the example implementation 402. The emojis or pictographic characters can provide additional context and attribute indicators that can improve the accuracy of machine learning models 185. The second classification corresponds to the emotion "approval," and the third classification corresponds to the emotion "gratitude." Each attribute category can be associated with a probability value, which can indicate the machine learning model's confidence in the classification. Based on the combined classified categories and the associated probability values, the machine learning model 185 can determine an overall sentiment for the input, which in this case is "positive".

In another example implementation 404, the textual input "I'm sorry, I didn't want to say that!" is processed by the machine learning model 185. The first classification result identifies the attribute category of "remorse", with a probability score of 0.74245644. The probability score indicates a strong likelihood that the textual input indicates a negative emotional category. The second classification corresponds to the attribute "sadness", and the third classification corresponds to the emotion "disappointment". Based on the classified categories and the associated probability values, the machine learning model 185 can determine that the overall sentiment of the input is "negative".

Figure 5:
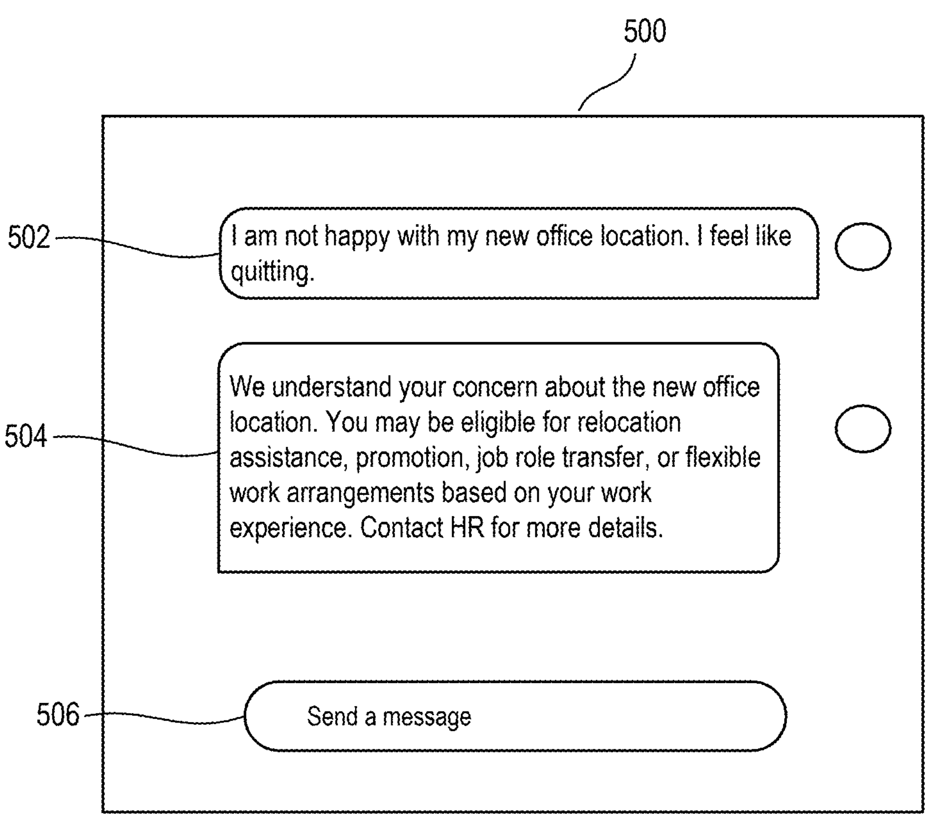
FIG. 5 depicts an example chatbot interface, in accordance with some implementations.

FIG. 5 depicts an example chatbot interface. As shown, the chatbot interface 500 can display a prompt 502 based on a user's interaction with a message bar 506. The prompt 502 can be a textual input entered by a user via the message bar 506. The message bar 506 can be used to input text or initiate voice commands for sending prompts 502. In this example, the prompt 502 reads, "I am not happy with my new office location. I feel like quitting". The machine learning model 185 can classify the textual input into attribute and content-based categories and assign a polarity score corresponding to the sentiment expressed in the input. For example, the machine learning model 185 can classify the textual input into a "concern" content-based category with a "negative" emotional category, assigning a moderately negative polarity score. The data processing system 105 can input the identified categories, polarity score, and textual input into the payroll processing system 165 to identify a payroll-relevant event. The payroll processing system 165 can identify whether the input maps to relocation, benefits, or other work-related concerns. Based on the analysis, the payroll processing system 165 can identify the appropriate payroll-relevant event, such as "relocation assistance inquiry" or "job dissatisfaction".

The data processing system 105 can provide the data corresponding to the payroll-related event to the machine learning model 185, which generates a response data structure. The response data structure can include details and recommendations specific to the identified payroll-relevant event. The data processing system 105 can transmit the response data structure to the client device 115 over the network 110. The client device 115 can parse the data structure and display a message dialogue 504 via the chatbot interface 500. As shown, the message dialogue 504 reads, "We understand your concern about the new office location. You may be eligible for relocation assistance, promotion, job role transfer, or flexible work arrangements based on your work experience. Contact HR for more details."

In some cases, if the textual input indicates a potential churning event, such as dissatisfaction or a likelihood of departure, the machine learning model 185 can generate a command to proactively address the identified risk. The data processing system 105 can execute the command by interfacing with relevant systems. For example, the data processing system 105 can generate a support ticket in the customer support system, initiating automated workflows such as scheduling a follow-up communication with the user profile. In some instances, the command can trigger enhanced security protocols, such as modifying access control policies or implementing network security adjustments to protect sensitive payroll data.

C. Computing Environment

Figure 6:
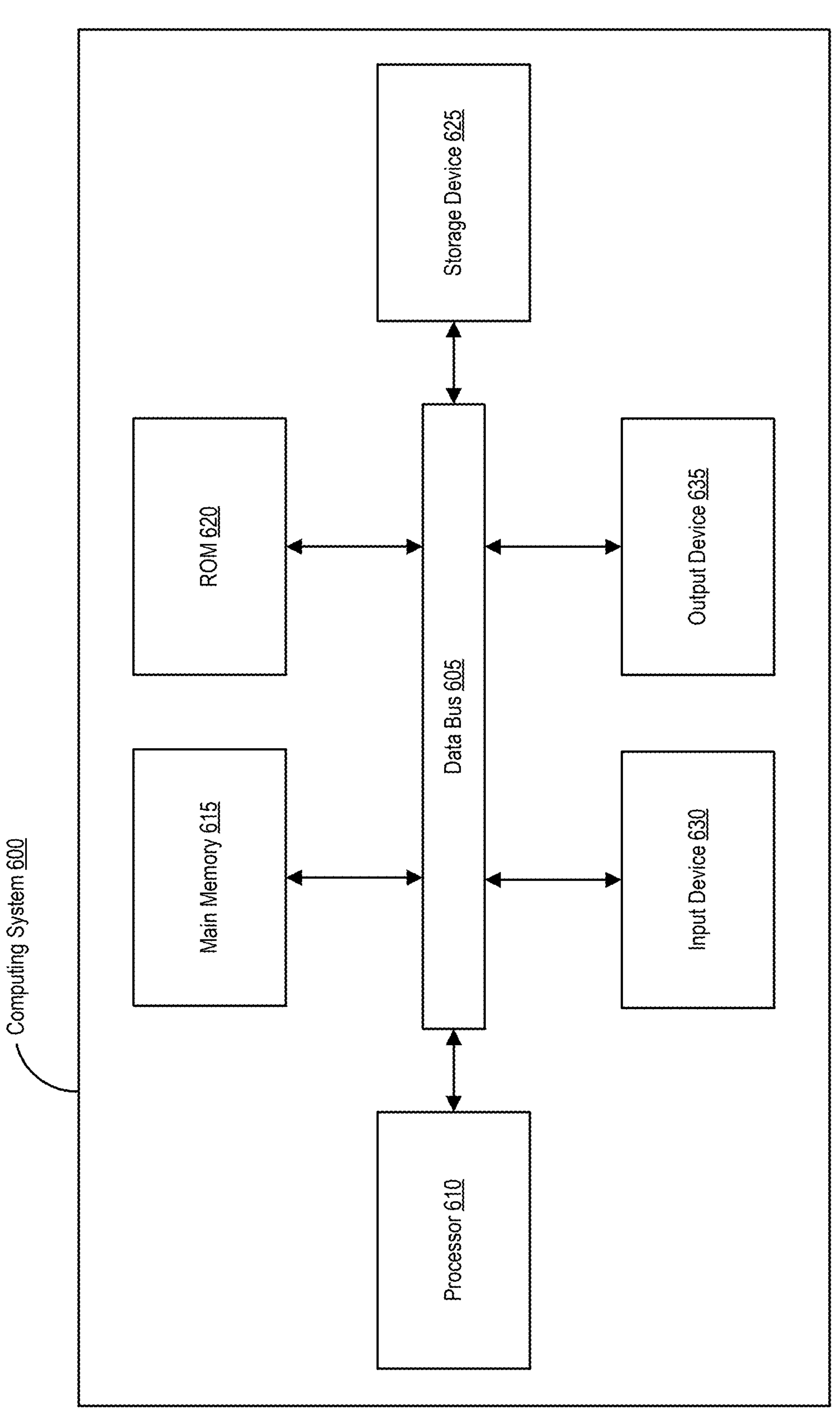
FIG. 6 depicts a block diagram of an example computing system for implementing the embodiments of the present solution, including, for example, the systems depicted in FIG. 1, and the methods depicted in FIGS. 2-3.

FIG. 6 depicts a block diagram of a computing system 600 for implementing the embodiments of the technical solutions discussed herein, in accordance with various aspects. FIG. 6 illustrates a block diagram of an example computing system 600, which can also be referred to as the computer system 600. Computing system 600 can be used to implement elements of the systems and methods described and illustrated herein. Computing system 600 can be included in and run any device (e.g., a server, a computer, a cloud computing environment or a data processing system).

Computing system 600 can include at least one bus data bus 605 or other communication device, structure or component for communicating information or data. Computing system 600 can include at least one processor 610 or processing circuit coupled to the data bus 605 for executing instructions or processing data or information. Computing system 600 can include one or more processors 610 or processing circuits coupled to the data bus 605 for exchanging or processing data or information along with other computing systems 600. Computing system 600 can include one or more main memories 615, such as a random access memory (RAM), dynamic RAM (DRAM), cache memory or other dynamic storage device, which can be coupled to the data bus 605 for storing information, data and instructions to be executed by the processor(s) 610. Main memory 615 can be used for storing information (e.g., data, computer code, commands or instructions) during execution of instructions by the processor(s) 610.

Computing system 600 can include one or more read only memories (ROMs) 620 or other static storage device 625 coupled to the bus 605 for storing static information and instructions for the processor(s) 610. Storage devices 625 can include any storage device, such as a solid-state device, magnetic disk or optical disk, which can be coupled to the data bus 605 to persistently store information and instructions.

Computing system 600 can be coupled via the data bus 605 to one or more output devices 635, such as speakers or displays (e.g., liquid crystal display or active matrix display) for displaying or providing information to a user. Input devices 630, such as keyboards, touch screens or voice interfaces, can be coupled to the data bus 605 for communicating information and commands to the processor(s) 610. Input device 630 can include, for example, a touch screen display (e.g., output device 635). Input device 630 can include a cursor control, such as a mouse, a trackball, or cursor direction keys, for communicating direction information and command selections to the processor(s) 610 for controlling cursor movement on a display.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors 610 in a multi-processing arrangement can also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter, including the operations described in this specification, can be implemented in other types of digital electronic circuitry, or in computer software, firmware, or hardware, including the structures disclosed in this specification and their structural equivalents, or in combinations of one or more of them.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes can be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component" or "data processing apparatus" or the like encompass various apparatuses, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including, by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. References to at least one of a conjunctive list of terms can be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the disclosed elements and operations without departing from the scope of the present disclosure.

What is claimed is:

1. A system, comprising:

one or more processors, coupled with memory, to:

receive, from a client device, a textual input via a chatbot interface associated with a profile;

classify, by one or more machine learning models, the textual input into one or more categories, the one or more categories corresponding to content-based categories and attribute categories, wherein the attribute categories relate to at least one of a positive emotion, a negative emotion, or a neutral emotion;

determine, by the one or more machine learning models, a polarity score for the textual input based on the one or more categories;

detect, via a payroll processing system, a payroll-related event based on the polarity score and the profile;

identify, using the one or more machine learning models, a churning event based on the payroll-related event, wherein the churning event relates to a disengagement of the profile from the payroll processing system; and in response to identifying the churning event, generate, by the one or more machine learning models, a command to adjust access control policies associated with the profile, wherein the command modifies access to a subset of payroll records maintained in a database.

2. The system of claim 1, wherein the payroll records comprise at least one of compensation details, time-off balances, benefits information, performance reviews, termination records, or tax records.

3. The system of claim 1, wherein the access control policies are associated with predefined security protocols governing access to the payroll records.

4. The system of claim 3, wherein the one or more processors are further configured to dynamically adjust the predefined security protocols in response to the churning event identified by the one or more machine learning models.

5. The system of claim 3, wherein the predefined security protocols comprise at least one of access restrictions based on user roles, multi-factor authentication requirements, activity-based access control, encryption policies for sensitive data, or time-based access permissions.

6. The system of claim 1, wherein the access control policies are associated with one or more fields of the profile, the one or more fields comprising an identity field, a compensation field, a benefits field, a time-off field, a tax information field, or a performance review field.

7. The system of claim 1, wherein the one or more machine learning models are trained using reinforcement learning.

8. The system of claim 1, wherein the content-based categories include payroll-related interactions directed to the payroll processing system, the payroll-related interactions comprising at least one of a request, a complaint, an inquiry, or a feedback submitted by users via the chatbot interface.

9. The system of claim 1, wherein a dataset of messages used to train the one or more machine learning models comprises a plurality of textual inputs submitted by client devices and corresponding output messages.

10. The system of claim 1, wherein the one or more processors are further configured to:

generate a digest comprising a summary of one or more events associated with the profile; and based on the polarity score and data corresponding to the payroll-related event, adjust frequency of the digest, wherein the adjustment comprises increasing or reducing the frequency of digest delivery.

11. A method, comprising:

receiving, from a client device, a textual input via a chatbot interface associated with a profile;

classifying, by one or more machine learning models, the textual input into one or more categories, the one or more categories corresponding to content-based categories and attribute categories, wherein the attribute categories relate to at least one of a positive emotion, a negative emotion, or a neutral emotion;

determining, by the one or more machine learning models, a polarity score for the textual input based on the one or more categories;

detecting, via a payroll processing system, a payroll-related event based on the polarity score and the profile;

identifying, using the one or more machine learning models, a churning event based on the payroll-related event, wherein the churning event relates to a disengagement of the profile from the payroll processing system; and in response to identifying the churning event, generating, by the one or more machine learning models, a command to adjust access control policies associated with the profile, wherein the command modifies access to a subset of payroll records maintained in a database.

12. The method of claim 11, wherein the payroll records comprise at least one of compensation details, time-off balances, benefits information, performance reviews, termination records, or tax records.

13. The method of claim 11, wherein the access control policies are associated with predefined security protocols governing access to the payroll records.

14. The method of claim 13, further comprising:

dynamically adjusting the predefined security protocols in response to the churning event identified by the one or more machine learning models.

15. The method of claim 13, wherein the predefined security protocols comprise at least one of access restrictions based on user roles, multi-factor authentication requirements, activity-based access control, encryption policies for sensitive data, or time-based access permissions.

16. The method of claim 11, wherein the access control policies are associated with one or more fields of the profile, the one or more fields comprising an identity field, a compensation field, a benefits field, a time-off field, a tax information field, or a performance review field.

17. The method of claim 11, wherein the content-based categories include payroll-related interactions directed to the payroll processing system, the payroll-related interactions comprising at least one of a request, a complaint, an inquiry, or a feedback submitted by users via the chatbot interface.

18. A non-transitory computer readable medium including one or more instructions stored thereon and executable by a processor to:

receive, by the processor, from a client device, a textual input via a chatbot interface associated with a profile;

classify, by the processor, using one or more machine learning models, the textual input into one or more categories, the one or more categories corresponding to content-based categories and attribute categories, wherein the attribute categories relate to at least one of a positive emotion, a negative emotion, or a neutral emotion;

determine, by the processor, using the one or more machine learning models, a polarity score for the textual input based on the one or more categories;

detect, by the processor, via a payroll processing system, a payroll-related event based on the polarity score and the profile;

identify, by the processor, using the one or more machine learning models, a churning event based on the payroll-related event, wherein the churning event relates to a disengagement of the profile from the payroll processing system; and in response to identifying the churning event, generate, by the processor, using the one or more machine learning models, a command to adjust access control policies associated with the profile, wherein the command modifies access to a subset of payroll records maintained in a database.

* * * * *